US012599889B2

(12) United States Patent
Zong et al.

(10) Patent No.: US 12,599,889 B2
(45) Date of Patent: Apr. 14, 2026

(54) PACKING ELEMENT, STRUCTURED PACKING AND USE OF STRUCTURED PACKING

(71) Applicant: EAST CHINA UNIVERSITY OF SCIENCE AND TECHNOLOGY, Shanghai (CN)

(72) Inventors: Yuan Zong, Shanghai (CN); Gance Dai, Shanghai (CN); Long He, Shanghai (CN); Hanguang Xie, Shanghai (CN)

(73) Assignee: EAST CHINA UNIVERSITY OF SCIENCE AND TECHNOLOGY, Shanghai (CN)

( * ) Notice: Subject to any disclaimer, the term of this patent is extended or adjusted under 35 U.S.C. 154(b) by 686 days.

(21) Appl. No.: 18/176,470

(22) Filed: Feb. 28, 2023

(65) Prior Publication Data

US 2024/0157326 A1 May 16, 2024

(30) Foreign Application Priority Data

Nov. 14, 2022 (CN) .......................... 202211425711.4

(51) Int. Cl.
B01J 19/32 (2006.01)

(52) U.S. Cl.
CPC ...... B01J 19/32 (2013.01); B01J 2219/32244 (2013.01); B01J 2219/3306 (2013.01)

(58) Field of Classification Search
CPC .............. B01J 19/32; B01J 2219/32244; B01J 2219/3306
USPC ........................................................ 422/310
See application file for complete search history.

(56) References Cited

U.S. PATENT DOCUMENTS 4,597,916 A 7/1986 Chen

FOREIGN PATENT DOCUMENTS

| CN | 2726714 Y | | 9/2005 |
| CN | 103191692 A | | 7/2013 |
| CN | 208436845 U | * | 1/2019 |

OTHER PUBLICATIONS

CN-208436845U—Machine translation (Year: 2026).*
CN-103191692A—Machine translation (Year: 2026).*
First Chinese Office Action dated May 11, 2023, for corresponding Chinese Application No. 202211425711.4.
Notification to Grant Patent Right for Invention dated Jul. 31, 2023, for corresponding Chinese Application No. 202211425711.4.

* cited by examiner

*Primary Examiner* — Huy Tram Nguyen
(74) *Attorney, Agent, or Firm* — Kinney & Lange, P.A.

(57) ABSTRACT

The present disclosure belongs to the technical field of packings, and in particular, to a packing element, a structured packing and an application of the structured packing. The packing element includes a collection-predistribution unit, a fluid uniform distribution unit, and an opening window unit that are sequentially arranged. The fluid uniform distribution unit includes a first substrate and a plurality of orifices arranged on the first substrate. Each orifice is circular and/or semicircular. Each orifice has an equivalent diameter of 1-5 mm. The opening window unit is provided with a plurality of windows, and each window has a length proportional to 0.5 power of the fluid viscosity. Fluid forms a confined free film in the window region of the opening window unit and wall-bounded film on the wall surface region.

12 Claims, 3 Drawing Sheets

Front view             Side view             Top view

Schematic
diagram

Front view

Side view

Top view

PACKING ELEMENT, STRUCTURED PACKING AND USE OF STRUCTURED PACKING

CROSS REFERENCE TO RELATED APPLICATION(S)

This patent application claims the benefit and priority of Chinese Patent Application No. 202211425711.4, filed with the China National Intellectual Property Administration on Nov. 14, 2022, the disclosure of which is incorporated by reference herein in its entirety as part of the present application.

TECHNICAL FIELD

The present disclosure belongs to the technical field of packing, and in particular, to a packing element, a structured packing and a use of the structured packing.

BACKGROUND

The interfacial mass transfer between gas and high viscous fluid has been widely used in many industrial processes, such as carbon capture, polymer devolatilization, etc. The viscosity of the fluid is usually tens or even thousands of times that of the aqueous solution. Due to the strong negative correlation between the interfacial mass transfer coefficient and the fluid viscosity, the increase of viscosity leads to a sharp decline in mass transfer efficiency, and then a rise in energy consumption.

The packing tower is one type of mass transfer separation equipment. The performance of packings is the key factor affecting the mass transfer efficiency. The packings fall into two categories generally, i.e. random and structured packing. The structured packing in the tower is orderly stacked according to well-distributed geometric pattern rules, with high separation efficiency, low pressure drop and easy scale-up. The current widely applied structured packing includes corrugated plate and wire gauze packing and so on. By optimizing the structure of the structured packing, the hydrodynamic properties of the liquid film on the surface of the packing can be significantly improved, thus the mass transfer performance of the packing can be enhanced. At present, the corrugated structured packing has been widely applied, and its main structure contains inclined corrugated channels. For example, according to United States patent U.S. Pat. No. 4,597,916A, a large number of orifices are formed on the surface of the corrugated packing, and the perforated sheets are connected to the through-holes to increase the gas-liquid contact area and improve mixing between gas and liquid. Another example, Chinese patent CN2726714Y has developed a wire gauze packing with at least two layers of crease-line corrugated edges, which can improve the wettability of the packing and results in more liquid film spreading on the wire gauze surface. This optimum structure increases the effective mass transfer area. In addition, the flow direction of the fluid is changed at the crease line, and the turbulence degree and surface renewal frequency of the liquid film are intensified.

Although technicians have improved the mass transfer efficiency of the packing by changing the structure of the structured packing, most of the current packings is only suitable for low or medium viscosity systems. The mass transfer coefficients of the existing structured packing, such as corrugated packing and perforated packing, decline exponentially with the increase of fluid viscosity.

SUMMARY

In view of this, the present disclosure provides a packing element, a structured packing and a use of the structured packing. The structured packing provided by the present disclosure can improve mass transfer efficiency between gas and high viscous fluid.

To solve the above technical problems, the present disclosure provides a packing element, including a collection-predistribution unit 1, a fluid uniform distribution unit 2, and an opening window unit 3 that are sequentially arranged.

The fluid uniform distribution unit 2 includes a first substrate and a plurality of orifices 2-1 arranged on the first substrate. Each orifice 2-1 is circular and/or semicircular. Each orifice 2-1 has an equivalent diameter from 1-5 mm.

The opening window unit 3 includes a second substrate and a plurality of windows 3-1 arranged on the second substrate. The length of the windows 3-1 is proportional to 0.5 power of the fluid viscosity.

Preferably, a distance between centers of any two adjacent orifices 2-1 in the fluid uniform distribution unit is between 5-20 mm.

Preferably, the orifices 2-1 are cross-arranged with 3-10 layers.

A proportion of a total area of the orifices 2-1 to the total area of the fluid uniform distribution unit is in the range of 40-80%.

Preferably, the shape of the windows 3-1 is rectangular, circular, or trapezoidal.

A proportion of the opening window area to a total area of the opening window unit 3 is in the range of 20-80%.

Preferably, a substrate region between any two adjacent windows in the opening window unit 3 is a wall 3-2. The width of the wall 3-2 is not greater than ¼ width of each window and is not less than 3 mm.

Preferably, the arrangement of the windows 3-1 in the opening window unit 3 includes in-line, staggered or cross arrangement.

Preferably, the collection-predistribution unit 1 includes a third substrate and folded sheets 1-1 located at an edge of the third substrate. The folded sheets 1-1 are distributed sequentially along the edge of the third substrate. A V-shaped structure is formed between any two adjacent folded sheets 1-1. The V-shaped structure has an included angle from 120-150°.

A length of each folded sheet 1-1 and a total height of a single packing element have a ratio of 1:(10-25).

Preferably, the ratio of the height of the collection-predistribution unit 1 to the height of a single packing element is in the range of 1:(10-25). And the ratio of the height of the fluid uniform distribution unit 2 to the height of a single packing element is in the range of 1:(8-25).

Furthermore, the present disclosure provides a structured packing, including packing elements arranged in parallel. Each packing element is the packing element in the above technical solution.

Furthermore, the present disclosure provides an application of the structured packing in the above technical solution for interfacial mass transfer between gas and high viscous fluid. The viscosity of the fluid can be between 0.1-100 Pa·s.

The present disclosure provides the packing element, including the collection-predistribution unit 1, the fluid uniform distribution unit 2, and the opening window unit 3 that are sequentially arranged. The fluid uniform distribution unit includes the first substrate and a plurality of orifices 2-1 arranged on the first substrate. Each orifice is circular and/or semicircular. Each orifice has an equivalent diameter from 1-5 mm. The opening window unit 3 includes a second substrate and a plurality of windows 3-1 arranged on the second substrate. Each window 3-1 has a length proportional to 0.5 power of fluid viscosity. The present disclosure collects and pre-distributes liquid through the collection-predistribution unit 1, and the collected liquid form a uniformly distributed liquid film through the fluid uniform distribution unit 2 under an effect of the orifices 2-1. The uniformly distributed liquid film passes a window 3-1 of the opening window unit 3 to form a confined free film. Because there lacks support from the wall in the window region, the fluid film accelerates and is thinned, which can enhance surface renewal frequency and thus improves gas-fluid interfacial mass transfer efficiency. In addition, the opening window area also leads to a thickness reduction of the film on a wall surface 3-2 region of the opening window unit 3. Hence, mass transfer enhancement can also be realized for the wall-bounded film over the wall surface region. In summary, the overall interfacial mass transfer of the structured packing can be effectively enhanced. The acceleration and thinning of the film flow in the opening window region and wall surface region provide a way to modulate the film flow with high viscosity, thus the interfacial mass transfer between gas and high viscous fluid can be effectively enhanced.

DETAILED DESCRIPTION OF THE EMBODIMENTS

Figure 1:
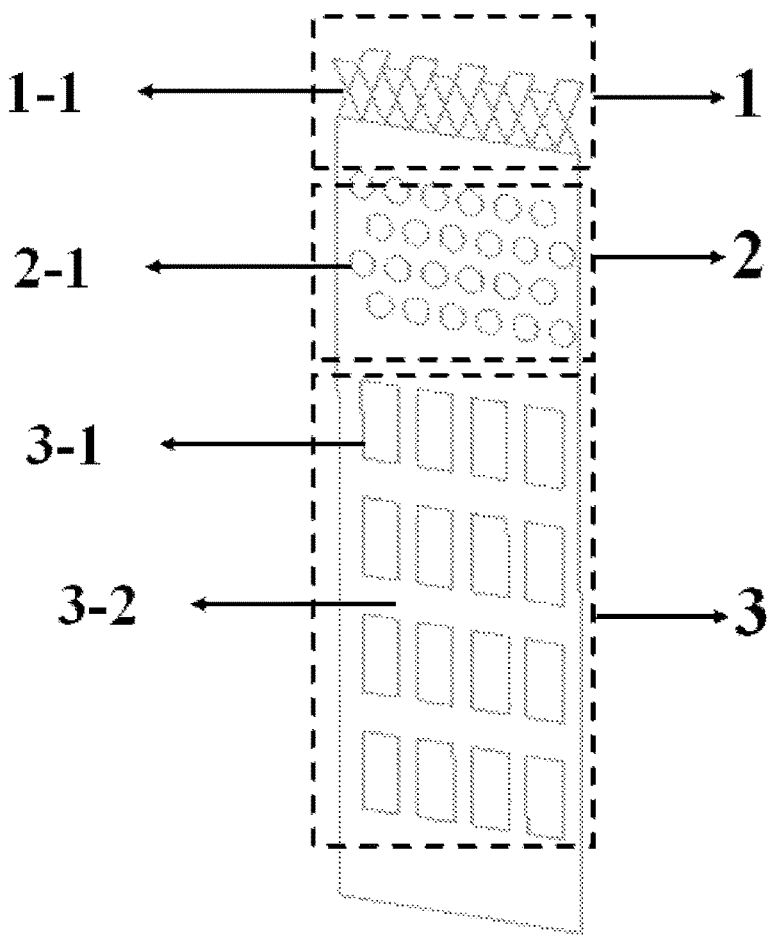
FIG. 1 is a schematic diagram of a packing element, where an orifice 2-1 is circular, the window of the opening window unit 3 is rectangular, 1 denotes a collection-predistribution unit, 1-1 denotes a folded sheet, 2 denotes a fluid uniform distribution unit, 2-1 denotes an orifice, 3 denotes an opening window unit, 3-1 denotes a window, and 3-2 denotes a wall surface.

The present disclosure provides a packing element, including a collection-predistribution unit 1, a fluid uniform distribution unit 2, and an opening window unit 3 that are sequentially arranged.

In the present disclosure, the collection-predistribution unit 1 preferably includes a third substrate and folded sheets 1-1 located at an edge of the third substrate. The folded sheets 1-1 are preferably distributed forward and backward along the edge of the third substrate. A V-shaped structure is preferably formed between any two adjacent folded sheets 1-1. The V-shaped structure has an included angle from 120-150°, preferably between 130-140°. In the present disclosure, the ratio of the length of each folded sheet 1-1 to a total height of a single packing element is in the range of 1:(10-25), preferably in the range of 1:(15-20). A width of each folded sheet 1-1 is from $\frac{1}{10}$ to $\frac{1}{30}$, preferably from $\frac{1}{15}$ to $\frac{1}{25}$, of the width of a packing sheet. In the present disclosure, a distance between outer edges of the folded sheets at the corresponding positions of any two adjacent packing elements in one structured packing is from $\frac{1}{8}$ to $\frac{1}{2}$, preferably from $\frac{1}{6}$ to $\frac{1}{4}$, of a distance between the centers of two adjacent packing elements. The present disclosure has no special requirements for the number of folded sheets, which can be set according to the width of the packing element. In the present disclosure, the ratio of the height of the collection-predistribution unit 1 to the height of a single packing element is in the range of 1:(10-25), preferably 1:(10-15).

The present disclosure has no special requirements for the forming method of the folded sheet, and conventional method can be adopted.

In the present disclosure, the liquid collection-predistribution unit 1 is located at the uppermost part of the packing element at the junction of the two packing elements. The liquid collection-predistribution unit 1 can collect the liquid flowing through the previous packing element and drains it to the fluid uniform distribution region of the following packing element, resulting in a uniform distribution of the liquid film.

In the present disclosure, the fluid uniform distribution unit 2 includes a first substrate and a plurality of orifices 2-1 arranged on the first substrate. Each orifice 2-1 is circular and/or semicircular. Each orifice 2-1 has an equivalent diameter of 1-5 mm, preferably 2-4 mm. In the present disclosure, a distance between centers of any two adjacent orifices 2-1 in the fluid uniform distribution unit is between 5-20 mm, preferably 10-15 mm. In the present disclosure, the orifices 2-1 are preferably cross-arranged with preferably 3-10 layers, more preferably 5-8 layers. In the present disclosure, a proportion of a total area of the orifices 2-1 in a total area of the fluid uniform distribution unit is preferably 40-80%, more preferably 55-65%. In the present disclosure, the ratio of the height of the fluid uniform distribution unit 2 to the height of a single packing element is in the range of 1:(8-25), preferably 1:(10-20), more preferably 1:(12-15).

The present disclosure preferably sets the number of orifices according to the length and width of the packing element. In the present disclosure, the number of orifices affects the film-forming. With the increase of the number of orifices, that is, the increase of the row number of orifices in the flow direction, film flow gradually becomes well distributed before entering the opening window region, which is more conducive to the film-forming in the opening window area.

In the present disclosure, a surface microstructure is preferably arranged on the wall surface of the fluid uniform distribution unit 2, and the surface microstructure is preferably a groove, bump, ripple or fabric structure. In the present disclosure, the surface microstructure can promote the spreading of film on the wall surface and prevent channel flow.

In the present disclosure, the fluid uniform distribution unit 2 distributes the flow after the liquid collection-predistribution unit 1, so that the film-forming within the opening window unit 3 can be ensured.

In the present disclosure, the opening window unit 3 includes a second substrate and a plurality of windows 3-1 arranged on the second substrate. Each window 3-1 has a length proportional to 0.5 power of fluid viscosity, preferably 10-500 mm. In the present disclosure, each window 3-1 is preferably rectangular, circular, or trapezoidal, more preferably rectangular. The length of the rectangle is preferably between 5-500 mm, more preferably 20-300 mm, and its width is preferably between 5-500 mm, more preferably 20-300 mm. In the present disclosure, a proportion of a window area in a total area of the opening window unit 3 is preferably between 20-80%, more preferably between 40-60%. In the present disclosure, a substrate region between any two adjacent windows in the opening window unit 3 is a wall surface 3-2. The width of the wall surface 3-2 in each region is preferably not greater than ¼ width of each window, and is not less than 3 mm.

The present disclosure limits the size and interval of the window in the opening window unit 3 within the above range, which can ensure fluid exchange between the wall bounded film on the wall surface and the confined free film in the opening window as well as improve the stability of the confined free film in the opening window region. The present disclosure can adjust the size and interval of the window according to the fluid viscosity and operating flow rate, so as to achieve favorable mass transfer between gas and high viscous fluid.

In the present disclosure, arrangement of a plurality of windows 3-1 in the opening window unit 3 preferably includes in-line, staggered or cross arrangement, more preferably in-line or staggered arrangement. In the present disclosure, in the opening window unit 3, the wall surface and the window coexist alternately regularly. After the film formed by the fluid uniform distribution unit 2 enters the window of the opening window unit 3, a confined free film is formed in the window area. The film accelerates to move downward driven by gravity, viscous force and surface tension. At the same time, the thickness of the liquid film is reduced. When the film enters the wall surface region of the opening window unit 3, the velocity of the film decreases and its thickness increases. The confined free film in the opening window region and the wall-bounded film on the wall surface region gradually become stable and co-exist in the opening window unit 3. As a result, the surface renewal frequency of the film, including the confined free film and the wall-bounded film, can be improved and the interfacial mass transfer between gas and high viscous fluid can be enhanced.

In the present disclosure, the packing element is preferably made of metal, ceramic or plastic, more preferably plastic. In the present disclosure, the metal preferably includes an aluminum plate or a modified stainless-steel plate.

Figure 2:
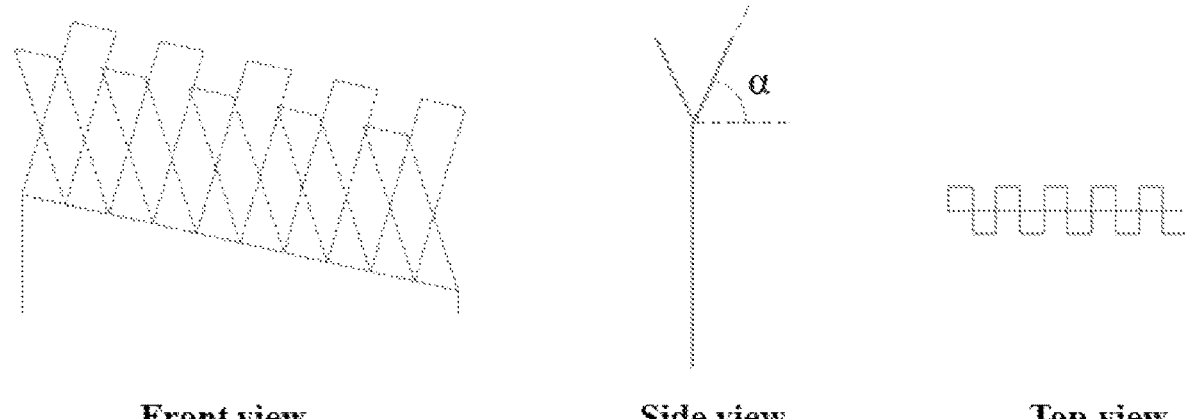
FIG. 2 shows a front view, side view and top view of the collection-predistribution unit 1, where a is an included angle between the folded sheet and a horizontal plane.
Figure 3:
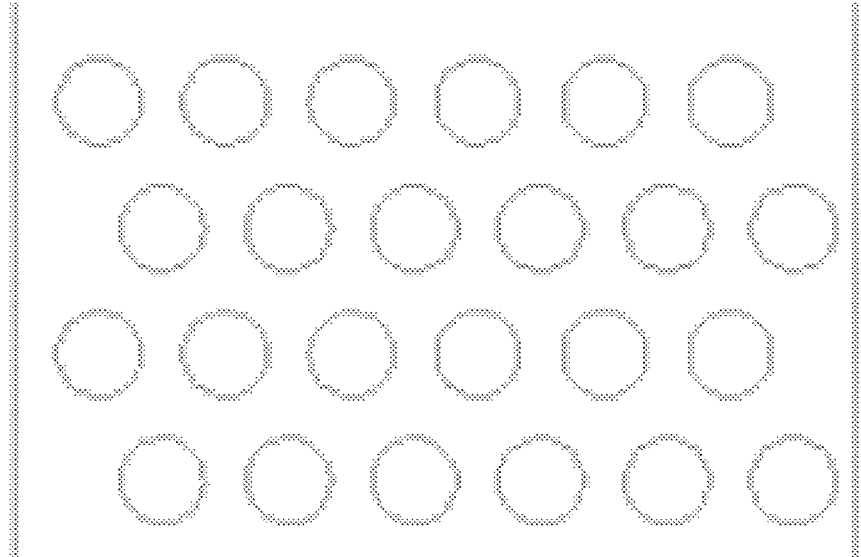
FIG. 3 is a schematic diagram of the fluid uniform distribution unit 2.
Figure 4:
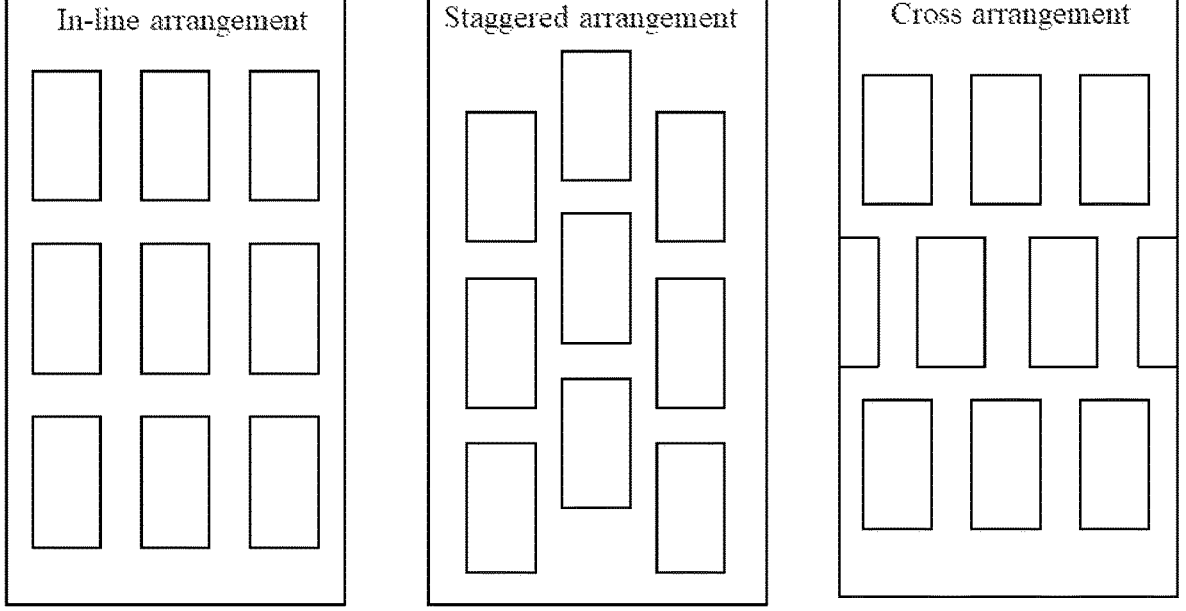
FIG. 4 is a schematic diagram of different arrangement of the opening window unit 3.

In the present disclosure, taking an orifice 2-1 being circular and a window of opening window unit 3 being rectangular as an example, a schematic diagram of a packing element is shown in FIG. 1, where 1 denotes a collection-predistribution unit, 1-1 denotes a folded sheet, 2 denotes a fluid uniform distribution unit, 2-1 denotes an orifice, 3 denotes a window opening unit, 3-1 denotes a window, and 3-2 denotes a wall surface. A front view, side view and top view of the collection-predistribution unit 1 are shown in FIG. 2, where a is an included angle between the folded sheet and a horizontal plane. A schematic diagram of the fluid uniform distribution unit 2 is shown in FIG. 3. A schematic diagram of different arrangements of the opening window unit 3 is shown in FIG. 4.

The present disclosure further provides a structured packing, including packing elements arranged in parallel. Each packing element is the packing element in the above technical solution. In the present disclosure, the collection-predistribution unit 1 of the packing element is above the structured packing. In the present disclosure, the shape of the structured packing is preferably rectangular. In the present disclosure, a distance between any two adjacent packing elements in the structured packing is preferably 3-15 mm, more preferably 5-10 mm.

In the present disclosure, a preparation method for the structured packing preferably includes the inserting method, winding method and integral processing method, more preferably the winding method. In the present disclosure, the inserting method preferably includes the following steps. Prepare a shell with a number of grooves, and arrange two adjacent layers of the packing elements in parallel, and then fix the top and bottom of the packing elements in the grooves. In the present disclosure, the width of the groove is slightly larger than that of the packing sheet. The groove has a thickness of preferably 0.5-2 mm, more preferably 1-1.5 mm, and a depth of preferably 4-10 mm, more preferably 5-8 mm. In the present disclosure, for a small packing tower, two adjacent layers of packing elements can be placed vertically. In the present disclosure, the winding method preferably includes the following steps. Arrange adjacent packing elements in parallel, and assemble the structured packing with fasteners. In the present disclosure, the fastener preferably includes an external band, a metal band or a metal wire. In the present disclosure, the integral processing method preferably includes three-dimensional (3D) printing.

Figure 5:
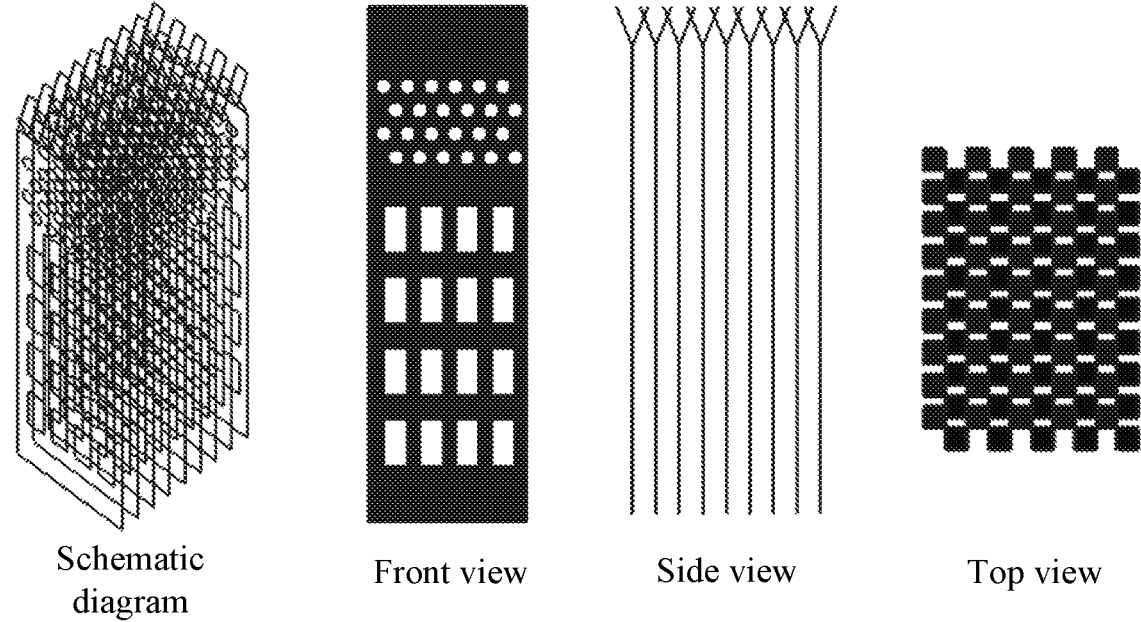
FIG. 5 is a schematic diagram of a structured packing.

In the present disclosure, a schematic diagram of a structured packing is shown in FIG. 5.

The present disclosure further provides an application of the structured packing in the above technical solution in the case of interfacial mass transfer between gas and high viscous fluid. In the present disclosure, the viscosity of the fluid is preferably between 0.1-100 Pa·s. In the present disclosure, the performance of the structured packing during interfacial mass transfer between gas and high viscous fluid can be applied to carbon capture or polymer devolatilization process, etc.

In order to further illustrate the present disclosure, the technical solutions provided by the present disclosure are described in detail below. But these examples should not be understood as limiting the claimed scope of the present disclosure.

Example 1

A tetramethylamine glycine ionic liquid aqueous solution with a mass concentration of 88% was used as high viscous fluid. The viscosity of the tetramethylamine glycine ionic liquid aqueous solution is 0.11 Pa·s.

The thickness of the liquid film on the surface of the packing element was measured using a laser sensor model CHROCODILE S, Precitec Optronik GmbH, Germany.

The adopted structured packing is shown in FIG. 5. The structure of a packing element is shown in FIG. 1. The packing element included a collection-predistribution unit, a fluid uniform distribution unit, and an opening window unit. The V-shaped structure formed by the folded sheet of the fluid uniform distribution unit and the vertical plate had an included angle of 135°. The length of each folded sheet and a total height of a single packing element had a ratio of preferably 1:15. The width of each folded sheet was ½₀ width of a packing sheet. The distance between outer edges of the folded sheets was ⅓ of a distance between the centers of any two adjacent packing elements. The ratio of the height of the collection-predistribution unit to the height of the packing element was 1:15. The fluid uniform distribution unit included 10 layers of cross-arranged orifices. Each orifice was circular and had an equivalent diameter of 3 mm. The distance between the centers of any two adjacent orifices was 10 mm. A proportion of a total area of the orifices 2-1 in a total area of the fluid uniform distribution unit was 60%. The ratio of the height of the fluid uniform distribution unit and the height of the packing element was 1:15. The windows in the opening window unit 3 were rectangles in in-line arrangement, and the wall surface between any two adjacent windows had a width of 4 mm. When the length of the rectangle was 12 mm and the width was 12 mm, it was recorded as a structured packing 1. When the length of the rectangle was 24 mm and the width was 12 mm, it was recorded as a structured packing 2. When the length of the rectangle was 48 mm and the width was 12 mm, it was recorded as a structured packing 3.

The falling film flow with high viscous fluid flowed through structured packing 2 with flow rates of $6.94 \times 10^{-5}$ $m^2/s$, $9.58 \times 10^{-5}$ $m^2/s$ and $2.22 \times 10^{-4}$ $m^2/s$. The thickness of the wall-bounded films on the wall surface was 1,200 μm, 1,400 μm and 1,700 μm, respectively. The confined free films in the opening window area had minimum thicknesses of 100 μm, 200 μm and 400 μm respectively, which was 14 times, 7 times and 4.25 times thinner than that of the wall-bounded film at the same flow rate, respectively.

The falling film of the tetramethylamine glycine ionic liquid aqueous solution was conducted on the surface of structured packing 1 and the structured packing 2 at the same flow rate of $9.58 \times 10^{-5}$ $m^2/s$. The minimum thickness of the confined free film in the opening window area of structured packing 1 and the structured packing 2 was 400 μm and 100 μm respectively.

At the same flow rate, the minimum thickness of the confined free film in the opening window area was gradually reduced with the increase of window length of the structured packing. The thinner the liquid film, the higher the surface renewal frequency as well as the lower the mass transfer resistance, especially for the interfacial mass transfer between gas and high viscous liquid.

Example 2

A tetramethylamine glycine ionic liquid aqueous solution with a mass concentration of 88% was used as a high viscous fluid. With a solid plate of 24 mm (width)*72 mm (length) as a substrate, a rectangular window was set in the central region of the substrate as a packing element to conduct a carbon capture experiment.

The above solid plate (24 mm*72 mm) without window was designated as Packing element A. Packing element B was with the opening window of 12 mm (width)*24 mm (length). Packing element C was with the opening window of 18 mm*36 mm. Packing element D was with the opening window of 24 mm*48 mm.

Packing element E has an increase in solid plate area, to 45 mm (width)*128 mm (length), without window. Based on Packing element E, 9 rectangular windows of 12 mm (width)*24 mm (length) were set on the solid plate. When the 9 rectangular windows were in in-line arrangement as shown in FIG. 4, it was recorded as Packing element F. When the 9 rectangular windows were in staggered arrangement as shown in FIG. 4, it was recorded as Packing element G. When the 9 rectangular windows were in cross arrangement as shown in FIG. 4, it was recorded as Packing element H.

The physical properties of the gas and fluid medium were shown in Table 1. The flow rate of the high viscous fluid at the inlet of the packing element was $9.58 \times 10^{-5}$ $m^2/s$. $CO_2$ in the tetramethylamine glycine ionic liquid aqueous solution at the inlet had a mass fraction of 0.

The overall mass transfer coefficients of four packings with different structures (Packing element A-D) could be calculated by testing the mass fraction of $CO_2$ in the tetramethylamine glycine ionic liquid aqueous solution at the outlet of the packing elements. The results are listed in Table 2.

In Example 2, Packing element A and Packing element E were the examples for comparison, which were vertical solid plates without an opening window. The mass fraction of $CO_2$ in the tetramethylamine glycine ionic liquid aqueous solution at the outlet of Packing element A and the Packing element E and their overall mass transfer coefficients were adopted as theoretical values to evaluate the carbon capture efficiency of the structured packings.

TABLE 1

Physical Properties of gas-liquid medium

| Parameter | Symbol | Value | Unit |
|---|---|---|---|
| Liquid viscosity | $\mu_L$ | 0.11 | Pa · s |
| Gas viscosity | $\mu_G$ | $1.789 \times 10^{-5}$ | Pa · s |
| Liquid density | $\rho_L$ | 1080 | $kg/m^3$ |
| Gas density | $\rho_G$ | 1.225 | $kg/m^3$ |
| Liquid surface tension | $\sigma$ | 0.11 | N/m |
| Diffusion coefficient in liquid | $D_L$ | $1.73 \times 10^{-9}$ | $m^2/s$ |
| $CO_2$ equilibrium concentration | $C^*_{CO2}$ | 1.716 | $kg/m^3$ |

TABLE 2

Mass transfer effect of different packing elements

| Packing | Diffusion coefficient | Mass fraction of $CO_2$ at outlet | Overall mass transfer |
|---|---|---|---|
| A | $1.73 \times 10^{-9}$ $m^2/s$ | $6.59 \times 10^{-5}$ | $5.67 \times 10^{-5}$ m/s |
| B | $1.73 \times 10^{-9}$ $m^2/s$ | $7.45 \times 10^{-5}$ | $6.48 \times 10^{-5}$ m/s |
| C | $1.73 \times 10^{-9}$ $m^2/s$ | $9.03 \times 10^{-5}$ | $7.90 \times 10^{-5}$ m/s |
| D | $1.73 \times 10^{-9}$ $m^2/s$ | $1.23 \times 10^{-4}$ | $1.09 \times 10^{-4}$ m/s |
| E | $1.73 \times 10^{-9}$ $m^2/s$ | $8.78 \times 10^{-5}$ | $4.26 \times 10^{-5}$ m/s |
| F | $1.73 \times 10^{-9}$ $m^2/s$ | $1.10 \times 10^{-4}$ | $5.37 \times 10^{-5}$ m/s |
| G | $1.73 \times 10^{-9}$ $m^2/s$ | $1.11 \times 10^{-4}$ | $5.42 \times 10^{-5}$ m/s |
| H | $1.73 \times 10^{-9}$ $m^2/s$ | $1.10 \times 10^{-4}$ | $5.37 \times 10^{-5}$ m/s |

It can be noticed from Table 2 that the mass transfer coefficient of the packings with an opening window (Packing element B-D and Packing element F-H) increases significantly compared with the plate packing elements without opening window (Packing element A and Packing element E). In addition, the mass transfer coefficient can be enhanced with the size increase of opening window. Under the tested experimental conditions, the maximum mass transfer coefficient (Packing element D) can be improved by 2.6 times compared with that of Packing element E.

In addition, when there is only one window, the mass transfer coefficient of Packing element B is increased by about 15% compared with that of the Packing element A. When the number of windows is increased to 9, the mass transfer coefficient of Packing element F is increased by about 25% compared with that of the Packing element E. This indicates that the packing with multiple opening windows has a stronger mass transfer enhancement. This example demonstrates that the highly efficient structured packing with opening windows is superior to a solid plate in interfacial mass transfer enhancement.

Although the above example has described the present disclosure in detail, it is only a part of, not all of, the examples of the present disclosure. Other examples may also be obtained by persons based on the example without creative efforts, and all of these examples shall fall within the protection scope of the present disclosure.

What is claimed is:

1. A packing element, comprising a collection-predistribution unit, a fluid uniform distribution unit, and an opening window unit that are sequentially arranged, wherein:

the fluid uniform distribution unit comprises a first substrate and a plurality of orifices arranged on the first substrate, the orifices are circular and/or semicircular, and each of the orifices has an equivalent diameter of 1-5 mm, wherein the orifices are cross-arranged with 3-10 layers, and a proportion of a total area of the orifices in a total area of the fluid uniform distribution unit is 40-80%; and the opening window unit comprises a second substrate and a plurality of windows arranged on the second substrate, and each of the windows has a length proportional to 0.5 power of the fluid viscosity;

wherein a substrate region between any two adjacent windows in the opening window unit is a wall surface, and a width of the wall surface in each substrate region is not greater than ¼ width of each window, and is not less than 3 mm;

wherein an arrangement of the plurality of windows in the opening window unit comprises in-line, staggered, or cross arrangement;

wherein the collection-predistribution unit comprises a third substrate and folded sheets located at an edge of the third substrate, the folded sheets are distributed sequentially along the edge of the third substrate, a V-shaped structure is formed between any two adjacent folded sheets, and the V-shaped structure has an included angle of 120-150°; and wherein a ratio of the height of the collection-predistribution unit to the height of a single packing element is in a range of 1:10-1:25, and a ratio of the height of the fluid uniform distribution unit to the height of a single packing element is in a range of 1:8-1:25.

2. The packing element according to claim 1, wherein a distance between centers of any two adjacent orifices in the fluid uniform distribution unit is 5-20 mm.

3. The packing element according to claim 1, wherein:
each window of the opening window unit is rectangular, circular, or trapezoidal; and
a proportion of an opening window area in the total area of the opening window unit is 20-80%.

4. The packing element according to claim 1, wherein:
a ratio of the length of each folded sheets to a total height of a single packing element is in a range of 1:10-1:25.

5. A structured packing, comprising packing elements arranged in parallel, wherein each of the packing elements is the packing element according to claim 1.

6. The structured packing according to claim 5, wherein a distance between centers of any two adjacent orifices in the fluid uniform distribution unit is 5-20 mm.

7. The structured packing according to claim 5, wherein:
each of the windows of the opening window unit is rectangular, circular, or trapezoidal; and
a proportion of the area of an opening window area of the opening window unit in a total area of the window opening unit is 20-80%.

8. The structured packing according to claim 5, wherein:
a length of each folded sheet and a total height of a single packing element have a ratio of 1:10-1:25.

9. A method for using the structured packing according to claim 5 in interfacial mass transfer between gas and high viscous fluid, wherein a viscosity of the fluid is in a range of 0.1-100 Pa·s.

10. The method according to claim 9, wherein a distance between centers of any two adjacent orifices in the fluid uniform distribution unit is 5-20 mm.

11. The method according to claim 9, wherein:
each window of the opening window unit (3) is rectangular, circular, or trapezoidal; and
a proportion of an opening window area in the total area of the opening window unit is 20-80%.

12. The method according to claim 9, wherein a ratio of the length of each folded sheets to a total height of a single packing element is in a range of 1:10-1:25.

* * * * *